United States Patent Office 2,832,139
Patented Apr. 29, 1958

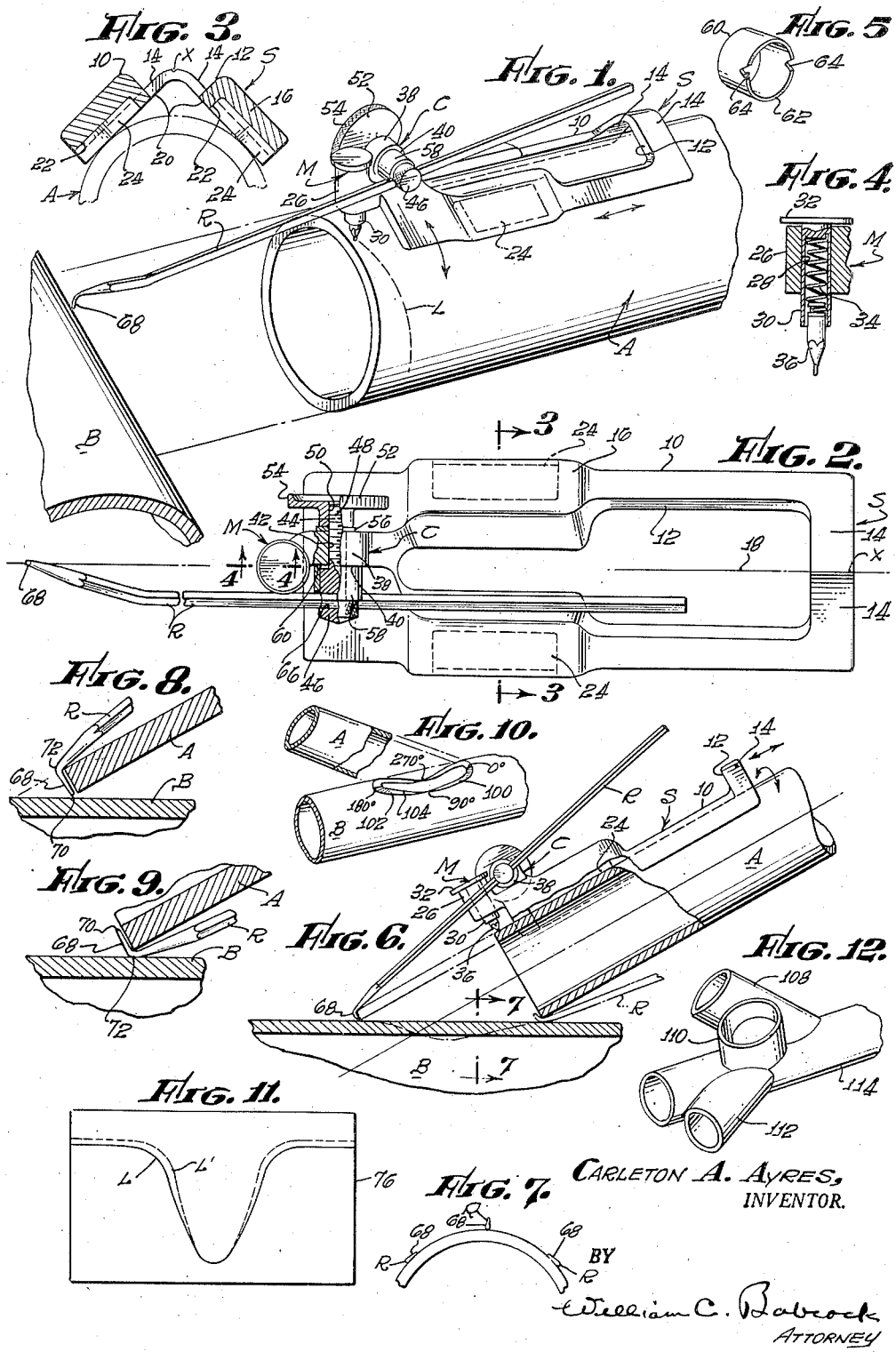

2,832,139

WELDING DEVICE

Carleton A. Ayres, Torrance, Calif.

Application May 28, 1956, Serial No. 587,760

10 Claims. (Cl. 33—21)

The present invention relates to the field of welding layout tools, and more specifically to a tool for use in joining a cylindrical member to a flat or curved surface with a predetermined angle included therebetween.

Although tools for this purpose have previously been devised and marketed in the past, none of them has taken the form of a simple hand tool that could be used in the field to join any cylindrical member or tubing to any flat or curved surface at any angle. Templates that can be wrapped around a cylinder have been widely used, but each template is adapted for only one size of cylinder to be joined to a flat surface or another curved surface of specific radius at only one specific angle. Therefore, in using templates the welder must necessarily carry a large stock of such devices. Moreover, even though the templates are carefully engineered, it has been found that they do not always conform to the conditions actually encountered in the field.

Various visual devices such as gauges and protractors have also been heretofore provided, but these are bulky and cumbersome in use and involve some technical calculation. Their greatest disadvantage, however, resides in the fact that they are often inaccurate. In making a layout that requires one member to be welded to another with a predetermined acute angle included therebetween, such devices do not automatically compensate for the wall thickness of the members. For example, in welding a lateral to a header or to a flat plate, the line of intersection is marked on the lateral, which is then radially cut along this line. Radial cutting means merely that the cutting nozzle is at all times held perpendicular to the axis of the cylindrical lateral. Obviously, the cutting line can only be marked on the exterior surface of the lateral, but if the line is a trace of the intersection of the exterior surface of the lateral and the surface to which it is to be joined, the resulting angle included therebetween will not be accurate. Since the end of the lateral is cut radially at all points, its exterior surface will contact the header along no more than one-half its circumference, and for the other half of its circular extent, the lateral will contact the header substantially along its inner diameter. Therefore, the cutting line marked on the exterior surface of the lateral must at all points be a trace of the actual intersection of header and lateral, rather than a trace of the intersection of the header with the outer diameter of the lateral. None of the previously available gauges will automatically compensate for the wall thickness of the lateral, so that an accurate cutting line can only be approximated or calculated with such devices.

An important object of the present invention is to provide a welder's layout tool that will mark on the exterior surface of a cylindrical member, a cuting line that accurately defines the actual intersection of the cylinder and another plane or curved surface so that the cylinder can be joined to said surface at a predetermined angle.

Another object of the invention is to supply a layout tool of the type described that automatically compensates for the wall thickness of one of the members to be joined so that a layout of the connection of any two members at any given angle can be made without recourse to templates, tables or calculation.

It is a further object of the invention to make available a simple method of marking an accurate radial cutting line on a cylinder that is to be joined to another surface at a predetermined angle.

Still another object of the present invention is to furnish a simple tool and method of making welded fitting templates that require no special skills or specialized training whereby any journeyman worker can make such templates in the field.

The invetnion also has for an object, the provision of an extremely simple layout tool that can be economically fabricated from a few inexpensive parts and can be readily adapted for use with many different sizes of tubing or cylinders.

These and other objects and advantages of the invention will be readily apparent from the following description of a presently preferred form thereof when taken in conjunction with the annexed drawing illustrating that form, in which:

Figure 1 is a perspective view of the invention as used in joining two cylindrical members at a predetermined angle;

Figure 2 is a top plan view of the device;

Figure 3 is a vertical sectional view of the device taken on line 3—3 of Figure 2;

Figure 4 is a partial vertical sectional view taken on line 4—4 of Figure 2 showing the marking means of the device;

Figure 5 is a perspective view of a part of the bar holding means;

Figure 6 is a vertical elevation, partly in section, of the invention showing its method of operation in marking one of two cylindrical members that are to be joined;

Figure 7 is a vertical sectional and end view taken on line 7—7 of Figure 6;

Figure 8 is a partial vertical enlarged sectional view, indicating the manner in which the device compensates for the full wall thickness of the cylinder being marked for cutting;

Figure 9 is a partial vertical enlarged sectional view, showing the operation of the device in a position diametrically opposite to that shown in Figure 8;

Figure 10 is a perspective view of the end area of an angularly disposed pipe properly formed to intersect with a header.

Figure 11 is a plan view of a template made in accordance with my invention; and Figure 12 is a perspective view of a number of laterals, the ends of which have been cut by the use of the invention to properly intersect a header.

Referring now to the drawing for the general arrangement of the invention, and in particular to Figure 1 thereof, it will be seen that the device is placed on one end of a cylindrical member A that is adjacent to a second cylinder B. In the set-up shown in Figure 1, cylinder A is of smaller diameter than cylinder B and is to be joined thereto by welding with a predetermined angle included therebetween. In addition, the axes of the cylinders are intended to intersect. However, it is to be understood that the layout tool of the present invention can be used to mark any cylinder A for joining to any other surface at any angle. Such surface could be plane, regularly or irregularly curved, or any piece of tubing of at least the same size as cylinder A.

The invention includes a support S of V-shaped transverse cross section that is adapted to slidably engage the outer diameter of cylinder A in such a way that the longitudinal centerline of support S is at all times parallel to the axis of the cylinder. As is apparent, support S is self-centering on various cylinder sizes, and as it is slid around a cylinder it tends to remain in alignment therewith. At its forward end, support S is provided with marking means M that leave a continuous line L on cylinder A when support S is moved. Also at its forward end said support has frictional clamping means C that adjustably support a longitudinally extending, elongate, L-shaped bar R. Bar R terminates in a narrow forward end portion of the same length as the wall thickness of cylinder A and is disposed normally to the axis of the cylinder. Bar R is so adjusted that the inner tip of its forward end portion is even with the inner diameter of cylinder A. The device is placed on cylinder A with the narrow end portion of bar R in contact with the surface of cylinder B. Support S is then slid around cylinder A while the end of bar R is at all times in contact with the surface of cylinder B, whereupon marking means M leave a continuous line L on cylinder A. If cylinder A is then radially cut along line L, it can be butted against the surface of cylinder B with said predetermined angle included therebetween.

Support S, as can best be seen in Figures 1 and 2, is preferably fabricated from a metal casting 10 of substantially V-shaped transverse cross section. As shown in Figure 2, casting 10 has a centrally disposed, longitudinally extending opening 12 formed therein and is of lesser thickness in its rear portion so that it can be easily grasped in the hand. Casting 10 has two angularly related sides 14 formed with enlarged forwardly disposed portions 16. Sides 14 are symmetrically disposed on opposite sides of the longitudinal centerline 18 of casting 10 and on their inner faces 20 are ground perfectly flat. As seen in Figure 3, each of the inner faces 20 is provided with a substantially rectangular recess 22 at enlarged portion 16 of each side so that a rectangular bar magnet 24 can be affixed therein. Magnets 24 can be fastened to casting 10 by means of an adhesive or by screws and are placed flush with inner faces 20. It will be apparent that casting 10 can receive between its sides 14, many sizes of cylinder and will center itself thereon so that its centerline 18 is at all times parallel to the axis of the cylinder. By this construction, any circumferential movement of casting 10 causes bar R and marking means M to move in unison therewith, while magnets 24 serve to releasably connect the device to cylinder A.

A vertically disposed cylindrical portion 26 is integrally formed with casting 10 on the forward portion thereof to support marking means M. Referring to Figure 4, it will be seen that cylindrical portion 26 is formed with an axial bore 28 in which a tubular member 30 is snugly fitted. The upper or outer end of member 30 is closed by a circular cap 32 of greater diameter than portion 26 that can be grasped by the fingers to adjust the elevation of the marking means. A helical spring 34 is disposed within member 30 that at its upper end is fastened to cap 32 and at its lower end is fastened to a pencil stub 36, or any suitable line drawing medium.

It will be noted from Figure 2 that the marking means just described is centered along centerline 18 of support S in a plane bisecting the angle included between inner faces 20. While this location is not essential to the operation of the device, it is the preferred location since it is best situated for marking all sizes of pipe or cylinders to be handled by the tool. When the device is placed on cylinder A, spring 34 will be under compression so that pencil 36 is at all times urged against the cylinder. Due to surface irregularities of cylinder A, some vibration will be induced in support S as it is slidably moved thereover, but spring 34 will insure the marking of a smooth, continuous, easily visible line.

Casting 10 on its forward end has an upwardly projecting piece 38 formed integrally therewith in which clamping means C are supported. Piece 38 is substantially cylindrical in configuration and extends transversely of casting 10 on one side of centerline 18. One end of piece 38 is positioned on the centerline and terminates in a face 40 that is ground flat in a plane bisecting the angle included between inner faces 20 of casting 10. The reason for this arrangement will presently become apparent.

The structure of clamping means C is best seen in Figure 2. Piece 38 is formed with an axial bore 42 extending therethrough that is normal to face 40 thereof. Slidably inserted through bore 42 is the threaded stem 48 of a bolt 44 that has an enlarged cylindrical head 46. Bolt head 46 is disposed on the same side of piece 38 as face 40, and bolt stem 48 is long enough to project from the other side of piece 38 to engage a threaded bore 50 formed in the center of a circular knob 52. The rim 54 of knob 52 is knurled to facilitate turning thereof, and a soft washer 56 is placed on bolt stem 48 between knob 52 and piece 38.

Slidably mounted on bolt head 46 is a sleeve 58, best seen in Figure 5, the inner end face 60 of which is adapted to contact face 40 of piece 38 in such a way that the axis of the sleeve is normal to face 40. The outer end face 62 of sleeve 58 is parallel to the inner end face 60 and is formed with two diametrically opposite, identical V-shaped notches 64.

Referring to Figure 2, it will be seen that bolt head 46 has a transversely disposed bore 66 formed therein that is substantially parallel to face 40 of piece 38. Bar R is slidably mounted in bore 66 and it can be seen that when knob 52 is rotated in one direction, bolt 44 moves inwardly thereof so that the bar is clamped between outer end face 62 of sleeve 58 and a wall portion of bolt head bore 66. Bar R is an elongate L-shaped member of square or polygonal cross section complementary to notches 64 of the sleeve so that one edge of the bar is received in the notches. Bar R is thereby prevented from rotating or twisting about its longitudinal axis so that the narrow forward end 68 thereof is at all times held in a position pointing radially normally inward toward the axis of cylinder 14.

As Figure 2 shows, the follower bar R extends longitudinally forward beyond the front end of support S and can be longitudinally adjusted by merely loosening clamping means C. At its forward end, the bar is bent back toward centerline 18 of the device so that the narrow end thereof is centered thereon, and as face 40 of piece 38 is in the plane bisecting the angle included between inner faces 20 of casting 10, end 68 of bar R is movable only in said plane. It will be seen that as the device is moved through 360° on cylinder A, end 68 and marking means M must move in unison, i. e., both will move exactly the same distance axially or circumferentially of cylinder A.

Narrow end 68 of bar R is preferably at all times disposed radially normal to the axis of cylinder A, but since the angle thereof relative to the bar is fixed, it will be apparent that the angle thereof relative to the axis of cylinder A will depend on the extent to which it projects forwardly from support S. However, it has been found that if end 68 is adapted to be accurately disposed for use in joining two members with an included angle of approximately 40° or 45° therebetween, the device is sufficiently accurate for practical use in joining two members at any angle.

Referring now to Figures 6, 8 and 9, it will be seen that end member 68 is of the same length as the wall thickness of cylinder A and is adjusted by means of clamping means C so that its inner tip 70 is even with the inside diameter of cylinder A. Since cylinders of differing wall thicknesses will be encountered, a rod R having a narrow end portion of correct length will be provided for each size of cylinder likely to be encountered. The outer corner 72 of end 68 will then be even with the outer diameter of cylinder A and the device is ready for use in the following manner.

Cylinder A is set up at the desired angle relative to cylinder B but slightly spaced away therefrom, as shown in Figure 6. Support S is then placed on cylinder A, preferably on the side thereof defining an obtuse angle with cylinder B and adjacent the forward end of cylinder A. Bar R is then adjusted longitudinally until end 68 contacts the surface of cylinder B at approximately the same place as the projection of cylinder A, as shown in Figure 6. Bar R is lightly clamped in position and the device then slid axially away from cylinder B until end 68 of bar R comes into contact with the end of cylinder A. End 68 is then adjusted with its tip 70 even with the inside diameter of cylinder A.

The device is slid back toward cylinder B until end 68 once again contacts the surface thereof, after which cap 32 of marking means M is pushed down to force pencil 36 into marking engagement with the surface of cylinder A, whereupon the device is moved simultaneously circumferentially and axially to slide it through 360° around cylinder A with end 68 of bar R at all times being held in contact with the surface of cylinder B. In this manner pencil 36 leaves a continuous line L around cylinder A which at all points traces the actual line of intersection L of cylinder A with cylinder B. Therefore, if cylinder A is cut along line L with the tip of the cutting torch (not shown) disposed normal to the center line of cylinder A, the cylinder will have an ellipsoidal end area 100 formed thereon as shown in Figure 10, whose edges conform to the configuration of the exterior surface of cylinder B. The end area is defined by two lines 102 and 104 that, viewed in perspective, are at their maximum distance from one another at 0 and the 180° marks, and approach closest to one another near the 90° and 270° marks. In passing from the 0 to the 180° position the end 68 rotates from the position shown in Figure 8 where the tip 70 contacts the surface of cylinder B to the position shown in Figure 9 where the portion 72 of end 68 is in contact with cylinder B.

If desired, a template can be formed by wrapping a sheet of paper, or the like, around cylinder B and trace the line L directly on the sheet by means of the invention. The sheet may then be cut along the trace line and used as a template to form the cutting line on not only the cylinder B, but other cylinders of the same diameter and wall thickness that are to intersect cylinder A at the same angle as cylinder B. A line L' is shown on sheet 76 in phantom line merely for the sake of comparison to demonstrate the error that would ensue if the end 68 should be dispensed with, and the straight end of rod R caused to movably engage the surface of cylinder A during formation of the trace line on cylinder A or sheet 76.

The operation of the invention has been described in detail and need not be repeated herein. Prior to using the invention, the end 68 is aligned by sighting along the marking means M and the point X shown in Figure 2. The various angles at which cylinders 108, 110, and 112 can be cut by the use of the invention to intersect a header 114 is shown in Figure 12.

Although the form of the invention herein shown and described is fully capable of achieving the objects and providing the advantages hereinbefore mentioned, it is to be understood that it is merely illustrative of the presently preferred embodiment thereof and that I do not mean to limit myself to the details of construction herein shown and described other than as defined in the appended claims.

I claim:

1. A device for marking around the outer surface of a cylinder a continuous line along which said cylinder is to be cut in order to be welded to another surface at a predetermined angle thereto, that includes: a narrow member of the same length as the wall thickness of said cylinder; means that can slidably engage the outer surface of said cylinder to support said member for movement around the axis of said cylinder in such a way that when said cylinder is supported adjacent said other surface with said predetermined angle included therebetween, said member is disposed beyond the end of said cylinder in contact with said other surface and radially normal to the axis of said cylinder in the same plane as said cylinder wall; and marking means on said support means in marking contact with the outer surface of said cylinder so that when said device is moved around said cylinder with said member at all times held in contact with said other surface, a continuous line is drawn around said cylinder along which said cylinder can be cut at a right angle to said outer surface thereof to define an end thereof that will abut said other surface to provide said predetermined angle.

2. A device for marking around the outer surface of a cylinder a continuous line along which said cylinder is to be cut in order to be welded to another surface at a predetermined angle thereto, that includes: means to mark a continuous line around said cylinder; means that can slidably engage the outer surface of said cylinder with two oppositely disposed, laterally separated lines of contact that are parallel to the axis of said cylinder to support said marking means in contact with said cylinder; and an elongate L-shaped rigid member on said support means and movable in unison therewith that terminates in a narrow end portion that slidably engages said other surface when said cylinder is supported adjacent thereto, said narrow end portion being of the same length as the wall thickness of said cylinder and disposed normal to the axis of said cylinder beyond the end thereof to extend radially inwardly from the projected outer surface of said cylinder so that when said support means is slidably moved around said cylinder with said narrow end portion of said member at all times held in contact with said other surface, said marking means will draw a continuous line around said cylinder along which said cylinder can be cut at a right angle to said outer surface thereof to define an end thereof that will abut said other surface to provide said predetermined angle.

3. A device as defined in claim 2 in which said support means is provided with magnetic means to releasably hold said support means against said cylinder.

4. A device as defined in claim 3 in which said support means is a substantially rectangular rigid member of V-shaped transverse section having a pair of oppositely disposed inner flat faces that contact said cylinder in lines parallel to the axis thereof.

5. A device as defined in claim 4 in which said L-shaped member is pivotally connected to said support means by frictional clamping means that can be tightened to maintain said member in predetermined position during sliding movement of said device on said cylinder.

6. A device as defined in claim 5 in which said marking means, said narrow end of said member, and the longitudinal centerline of said support means are within a plane that includes the axis of the cylinder on which said device is mounted.

7. A device as defined in claim 6 in which said frictional clamping means includes: an integrally formed portion of said support means that extends outwardly therefrom at one end thereof and includes a flat area in a plane including the axis of said cylinder; a bolt whose threaded stem is slidably inserted through a transverse bore formed in said outwardly extending portion of said support means and having an enlarged head with a hole formed therein in which said L-shaped member is slidably supported; a sleeve slidably mounted on said enlarged head of said bolt against said flat area; and a knob threadedly connected to said bolt on the side of said outwardly extending portion opposite to said flat area thereof that can be rotated to cause said L-shaped member to be clamped against an end of said sleeve as said bolt is drawn into said knob.

8. A device as defined in claim 7 in which said L-shaped member is of substantially rectangular cross section; and said sleeve on the end thereof opposite to said flat area is formed with a pair of diametrically opposite V-shaped notches adapted to receive an edge portion of said member therein in order to maintain said narrow end portion normally disposed to the axis of said cylinder.

9. A device as defined in claim 8 in which said marking means is provided with spring means to at all times be urged into marking contact with the exterior surface of said cylinder.

10. A method of marking on a cylinder a continuous line along which said cylinder can be radially cut in order to be welded to a surface at a predetermined angle thereto that includes: supporting said cylinder adjacent said surface with said predetermined angle included therebetween and with an end of said cylinder spaced apart from said surface; disposing a narrow member of the same length as the wall thickness of said cylinder in contact with said surface and extending from the projected outer surface of said cylinder radially normally to the axis thereof; placing marking means on the outer surface of said cylinder; and moving said member and marking means in unison through 360° around said axis with said member at all times being maintained in radial alignment with the longitudinal axis of said cylinder at a fixed distance therefrom and being held in contact with said surface.

References Cited in the file of this patent
UNITED STATES PATENTS

| | | |
|---|---|---|
| 804,067 | Stowe | Nov. 7, 1905 |
| 2,436,542 | Black | Feb. 24, 1948 |
| 2,625,741 | Jesonis | Jan. 20, 1953 |